(12) United States Patent  
Wang et al.

(10) Patent No.: US 8,175,871 B2
(45) Date of Patent: May 8, 2012

(54) APPARATUS AND METHOD OF NOISE AND ECHO REDUCTION IN MULTIPLE MICROPHONE AUDIO SYSTEMS

(75) Inventors: Song Wang, San Diego, CA (US); Samir Kumar Gupta, San Diego, CA (US); Eddie L. T. Choy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1257 days.

(21) Appl. No.: 11/864,906

(22) Filed: Sep. 28, 2007

(65) Prior Publication Data

US 2009/0089054 A1   Apr. 2, 2009

(51) Int. Cl.
G10L 21/02 (2006.01)
G10L 19/00 (2006.01)
G10L 17/00 (2006.01)
H04B 15/00 (2006.01)
H04M 9/08 (2006.01)

(52) U.S. Cl. ........ 704/227; 704/201; 704/226; 704/246; 702/191; 702/195; 702/197; 379/406.01; 379/406.03

(58) Field of Classification Search .................. None
See application file for complete search history.

(56) References Cited

U.S. PATENT DOCUMENTS

| | | | |
|---|---|---|---|
| 5,539,832 | A | 7/1996 | Weinstein et al. |
| 5,825,671 | A | 10/1998 | Deville |
| 6,526,148 | B1 | 2/2003 | Jourjine et al. |
| 6,694,020 | B1 * | 2/2004 | Benesty ............ 379/406.12 |
| 6,904,146 | B2 * | 6/2005 | Domer et al. ............ 379/406.01 |
| 7,020,294 | B2 | 3/2006 | Lee et al. |
| 7,359,504 | B1 * | 4/2008 | Reuss et al. ............ 379/406.02 |
| 7,464,029 | B2 | 12/2008 | Visser et al. |
| 7,496,482 | B2 | 2/2009 | Araki et al. |

(Continued)

FOREIGN PATENT DOCUMENTS

EP    0548054 A2    6/1993

(Continued)

OTHER PUBLICATIONS

Erik M. Visser, Manabu Otsuka, Te-Won Lee. "A spatio-temporal speech enhancement scheme for robust speech recognition in noisy environments." Speech Communication, 2003: 393-407.*

(Continued)

*Primary Examiner* — Matthew Sked
(74) *Attorney, Agent, or Firm* — Espartaco Diaz Hidalgo

(57) ABSTRACT

Multiple microphone noise suppression apparatus and methods are described herein. The apparatus and methods implement a variety of noise suppression techniques and apparatus that can be selectively applied to signals received using multiple microphones. The microphone signals received at each of the multiple microphones can be independently processed to cancel echo signal components that can be generated from a local audio source. The echo cancelled signals may be processed by some or all modules within a signal separator that operates to separate or otherwise isolate a speech signal from noise signals. The signal separator can include a pre-processing de-correlator followed by a blind source separator. The output of the blind source separator can be post filtered to provide post separation de-correlation. The separated speech and noise signals can be non-linearly processed for further noise reduction, and additional post processing can be implemented following the non-linear processing.

32 Claims, 7 Drawing Sheets

U.S. PATENT DOCUMENTS

| | | | |
|---|---|---|---|
| 7,630,502 B2* | 12/2009 | Beaucoup et al. | 381/92 |
| 7,653,537 B2 | 1/2010 | Padhi et al. | |
| 7,817,808 B2 | 10/2010 | Konchitsky et al. | |
| 7,970,564 B2* | 6/2011 | Wang et al. | 702/66 |
| 2002/0114472 A1 | 8/2002 | Lee et al. | |
| 2002/0172374 A1 | 11/2002 | Bizjak | |
| 2003/0061185 A1 | 3/2003 | Lee et al. | |
| 2003/0179888 A1 | 9/2003 | Burnett | |
| 2005/0060142 A1* | 3/2005 | Visser et al. | 704/201 |
| 2005/0105644 A1 | 5/2005 | Baxter et al. | |
| 2006/0013101 A1 | 1/2006 | Kawana et al. | |
| 2006/0053002 A1 | 3/2006 | Visser et al. | |
| 2006/0080089 A1 | 4/2006 | Vierthaler et al. | |
| 2007/0021958 A1 | 1/2007 | Visser | |
| 2007/0257840 A1 | 11/2007 | Wang et al. | |

FOREIGN PATENT DOCUMENTS

| | | |
|---|---|---|
| EP | 0729288 | 8/1996 |
| JP | 11298990 A | 10/1999 |
| JP | 2003005790 A | 1/2003 |
| JP | 2003333698 A | 11/2003 |
| JP | 2004274683 A | 9/2004 |
| JP | 2005227512 A | 8/2005 |
| JP | 2006510069 A | 3/2006 |
| JP | 2007193035 A | 8/2007 |
| JP | 2008507926 A | 3/2008 |
| WO | 9711538 | 3/1997 |
| WO | 0195666 | 12/2001 |
| WO | 2004008804 | 1/2004 |
| WO | WO2006132249 A1 | 12/2006 |

OTHER PUBLICATIONS

Parra, L.; Spence, C.; "Convolutive blind separation of non-stationary sources," Speech and Audio Processing, IEEE Transactions on, Issue Date: May 2000, vol. 8 Issue:3, on pp. 320-327.*

Juha Karvanen, Toshihisa Tanaka. Temporal Decorrelation as Preprocessing for Linear and Post-nonlinear ICA. In Proceedings of ICA'2004. pp. 774-781.*

Barrere, J. et al.: "A Compact Sensor Array for Blind Separation of Sources," IEEE Transactions on Circuits and Systems-I: Fundamental Theory and Applications, vol. 49, No. 5, May 2002.

Belouchrani, A. et al.: "Blind Source Separation Based on Time-Frequency Signal Representations," IEEE Transactions on Signal Processing 46 (11), pp. 2888-2897.

Chen, J. et al.: "Speech Detection Using Microphone Array," Electronics Letters Jan. 20, 2000 vol. 36 No. 2, pp. 181-182.

Cho, Y et al.: "Improved Voice Activity Detection Based on a Smoothed Statistical Likelihood Ratio." Centre for Communication Systems Research, University of Surrey, Guildford. Surrey GU2 7XH, UK, ICASSP, IEEE International Conference on Acoustics, Speech and Signal Processing—Proceedings 2, pp. 737-740.

Doukas, N. et al.: "Voice Activity Detection Using Source Separation Techniques," Signal Processing Section. Dept of Electrical Engineering, Imperial College, UK.

ETSI EN 301 708 v 7.1.1; "Digital Cellular Telecommunications System (Phase2+); Voice Activity Detector (VAD) for Adaptive Multi-Rate (AMR) Speech Traffic Channels," GSM 06.94 version 7.1.1 Release 1998.

Guerin. A,: "A Two-Sensor Voice Activity Detection and Speech Enhancement based on Coherence with Additional Enhancement of Low Frequencies using Pitch Information," LTSI, Universite de Rennes 1, Bat 22, 7eme etage, campus de Beaulieu. 35042 Rennes Cedex, France.

Haigh, J.A. et al.: "Robust Voice Activity Detection using Cepstral Features." Speech Research Group. Electrical Engineering Department, University College Swansea, SWANSEA, SA2 8PP, UK.

Hoyt, J. et al.: "Detection of Human Speech in Structured Noise," Dissertation Abstracts International, B: Sciences and Engineering 56 (1), pp. 342-B-343-B, 1995.

Junqua, J.C. et al.: "A Study of Endpoint Detection Algorithms in Adverse Conditions: Incidence on a DTW and HMM Recognize," in Proc. Eurospeech 91, pp. 1371-1374, 1991.

Molgedey, L.: "Separation of a Mixture of Independent Signals Using Time Delayed Correlations," Physical Review Letters 72 (23). pp. 3634-3637.

Parra. L. at al.: "Convolutive Blind Separation of Non-Stationary Sources," IEEE Transations on Speech and Audio Processing, vol. 8, No. 3, May 2000.

Rosca, J. et al.: "Multichannel Voice Detection in Adverse Environments," In Proc. EUSIPCO 2002, France, Sep. 2002.

Smaragdis: "Efficient Blind Separation of Convolved Sound Mixtures," Machine Listening Group, MIT Media Lab, Rm. E15-401C, 20 Ames St., Cambridge, MA 02139, 1997.

Srinivasant, K. et al.: "Voice Activity Detection for Cellular Networks," Center for Information Processing Research Dept. of Electrical and Computer Engineering, University of California Santa Barbara.

Tucker, R.: "Voice Activity Detection Using a Periodicity Measure," IEE Proceedings, Part I: Communications, Speech and Vision 139 (4), pp. 377-380.

Zoo, Q. et al.: "A Robust Speech Detection Algorithm in a Microphone Array Teleconferencing System," School of Electrical and Electronics Engineering, Nanyang Avenue, Nanyang Technological University, Singapore 639798, in Proc. ICASSP 2001, pp. 3025-3028.

International Search Report, PCT/US2008/077994, European Patent Office.

Jafari et al, "Adaptive noise cancellation and blind source separation", 4th International Symposium on Independent Component Analysis and Blind Signal Separation (ICA2003), pp. 627-632, Apr. 2003.

John D. Hoyt and Harry Wechsler, "Detection of Human Speech in Structured Noise," Procceedings of ICASSP '94, vol. 11, p. 237-240.

Karvanen et al., ("Temporal decorrelation as pre-processing for linear and post-nonliner ICA") (2004).

Lee et al., "Combining time-delayed decorrelation and ICA: Towards solving the cocktail party problem," IEEE (1998).

Wang, S. et al.: "Apparatus and Method of Noise and Echo Reduction in Mulitple Microphone Audio Systems," U.S. Appl. No. 11/864,906, filed Sep. 28, 2007.

Written Opinion of the International Searching Authority, PCT/US2008/077994.

Junqua, J.C. et al.: "A Study of Endpoint Detection Algorithms in Adverse Conditions: Incidence on a DTW and HMM Recognize," in Proc. Eurospeech 91, pp. 1371-1374. 1991.

Le Bouquin-Jeannes R et al: "Study of a voice activity detector and its influence on a noise reduction system", Speech Communication, Elseview Science Publishers, Amsterdam, NL, vol. 15, No. 3, Apr. 1, 1995, pp. 245-254.

Mukai et al. "Removal of residual cross talk component in blind source separation using time-delayed spectral subtraction", pp. 1789-1792, Proc of ICASSP 2002.

Mikai et al., "Removal of residual cross-talk component in blind source separation using LMS filters,", pp. 435-444, IEEE 2002.

Amari, A. Cichocki, and H. H. Yang, A new learning algorithm for blind signal separation, In Advances in Neural Information Processing Systems 8, MIT Press, 1996.

K. Anand, G. Mathew, and V. Reddy, Blind source separation of multiple co-cannel BPSK signals arriving at an antenna array, IEEE Signal Processing Letters, 2(9):176-178, Sep. 1995.

A. J. Bell and T. J. Sejnowski, An information-maximization approach to blind separation and blind deconvolution, Neural Computation, 7(6):1129-1159, 1995.

J. Benesty, T. Gansler, D. R. Morgan, M. M. Sondhi and S. L. Gay, Advances in Network and Acoustic Echo Cancellation, pp. 153-154, Springer, New York, 2001.

S. F. Boll, Suppression of Acoustic Noise in Speech Using Spectral Subtraction, IEEE Trans. Acoustics, Speech and Signal Processing, 27(2): 112-120, Apr. 1979.

C. Breining, et al., Acoustic echo control an application of very-high-order adaptive filters, IEEE Signal Processing Magazine, 16(4):42-69, 1999.

J.-F. Cardoso. Source separation using higher order moments, In Proc. ICASSP, pp. 2109-2112, 1989.

J.-F. Cardoso, The invariant approach to source separation, In Proc. of the intl.Symp. on Nonlinear Theory and Applications, Las Vegas, Nevada, USA, Dec. 1995.

J.-F. Cardoso, Blind signal separation: statistical principles, In Proc. of the IEEE, 90(8): 2009-2026, Oct. 98, special issue on blind identification and estimation, R.-W. Liu and L. Tong editors.

S. Choi, Blind source separation and independent component analysis: A review, Neural Information Processing Letters and Review, 6(1):1-57, Jan. 2005.

P. Comon, Independent component analysis, a new concept? Signal Processing, 36(3):287-314, 1994.

G. P. Eatwell, Single-channel speech enhancement, in Noise Reduction in Speech Applications, G. M. Davis, pp. 155-178, CRC Press, 2002.

F. Ehlers and H. G. Schuster, Blind separation of convolutive mixtures and an application in automatic speech recognition in a noisy environment, IEEE Tran. on SP, 45(10):2608-2612, Oct. 1997.

M. Gabrea, E. Mandridake, M. Menez, M. Najim and A. Vallauri, Two microphone speech enhancement system based on a double fast recursive least square (DFRLS) algorithm, in Proc. of EUSIPCO-96, vol. 2, pp. 983-986, Trieste, Italy, Sep. 1996.

M. Girolami, Noise reduction and speech enhancement via temporal anti-hebbian learning, In Proc. ICASSP 98, vol. 2, pp. 1233-1236, Seattle WA, May 1998.

M. Girolami, Symmetric adaptive maximum likelihood estimation for noise cancellation and signal separation, Electronics Letters, 33(17):1437-1438, 1997.

E. Hansler, Adaptive Echo Compensation Applied to the Hands-Free Telephone Problem, in Proc. of the IEEE, CAS-90: 279-282, 1990.

P. Heitkaemper and M. Walker, Adaptive gain control for speech quality improvement and echo suppression, in Proc. ISCAS 93, pp. 455-458, 1993.

C. Jutten and J. Herault, Independent components analysis versus principal components analysis, Signal Processing IV: Theo. and Appl. Elsevier publishers, pp. 643-646, 1988.

C. Jutten and J. Herault, Blind separation of sources, part I: An adaptive algorithm based on neurominetic architecture, Signal Processing, 24(1):1-10, 1991.

L. De Lathauwer, B. De Moor, and J. Vandewalle, Fetal electrocardiogram extraction by source subspace separation, In Proc. HOS95, pp. 134-138, Aiguablava, Spain, Jun. 1995.

S. Makeig, A. Bell, T.-P. Jung, and T. J. Sejnowski, Independent component analysis of electroencephalographic data, In Advances in Neural Information Processing Systems 8, MIT Press, 1995.

R. Mukai, S. Araki, H. Sawada and S. Makino, Removal of residual crosstalk components in blind source separation using LMS filters, In Proc. of 12th IEEE Workshop on Neural Networks for Signal Processing, pp. 435-444, Martigny, Switzerland, Sep. 2002.

R. Mukai, S. Araki, H. Sawada and S. Makino, Removal of residual cross-talk components in blind source separation using time-delayed spectral subtraction, In Proc. of ICASSP 2002, pp. 1789-1792, May 2002.

L. Nguyen, C. Jutten, Blind source separation for convolutive mixtures, Signal Processing, 45(2):209-229, 1995.

F. Sattar, M.Y. siyal, L. C. Wee and L. C. Yen, Blind source separation of audio signals using improved ICA method, In Proc. of the 11th IEEE Signal Processing Workshop on Statistical Signal Processing, pp. 452-455, Singapore, 2001.

M. Tahernezhadi et al., Acoustic echo cancellation using subband technique for teleconferencing applications, IEEE Globecom, pp. 243-247, 1994.

L. Tong, R. Liu, V. Soon and Y.F. Huang, The Indeterminacy and Identifiability of Blind Identification, IEEE Transactions on Circuits and Systems, CAS-21(5):499-509, May 1991.

K. Torkkola, Blind separation of convolved sources based on information maximization, IEEE workshop on NeuralNetworks for Signal Processing, Kyoto, Japan, Sep. 1996.

B. Widrow, J. R. Glover Jr., J. M McCool, J. Kaunitz, C. S. Williams, R. H. Hearn, J. R. Zeidler, E. Dong Jr., and R. C. Goodlin, Adaptive noise cancelling: Principles and applications, in Proc. of the IEEE, 63(12): 1692-1716, Dec. 1975.

J. Wouters, L. Litiere and van Wieringen, Speech intelligibility in noisy environments with one- and two-microphone hearing aids, Audiology, 38:91-98, 1999.

J. Xi and J. P. Reilly, Blind separation and restoration of signals mixed in convolutive environment, In Proc. ICASSP 1997, pp. 1327-1330, Germany, Apr. 1997.

H. Yasukawa and S. Shimada, An acoustic echo canceller using subband sampling and decorrelation methods, IEEE Trans. Signal Processing, 41(2): 926-930, Feb. 1993.

D. Yellin and E. Weinstein, Criteria for multichanncel signal separation, IEEE Trans. on Signal Processing, 42 (8):2158-2168, Aug. 1994.

Caihua Zhao et al: "An effective method on blind speech separation in strong noisy environment" VLSI design and video technology, 2005, Proceedings of 2005 IEEE International Workshop on Suzhou, China May 28-30, 2005 Piscataway, NJ, USA, IEEE May 28, 2005, pp. 211-214.

Curces S. et al: "Blind separation of convolutive mixtures: a Gauss-Newton algorithm" Higher-order statistics, 1997, Proceedings of the IEEE Signal Processing Workshop on Banff, Alta., Canada Jul. 21-23, 1997, Los Alamitos, CA, IEEE Comput. Soc. US Jul. 21, 1997, pp. 326-330.

Figueroa M. et al: "Adaptive Signal Processing in Mixed-Signal VLSI with Anti-Hebbian Learning" Emerging VLSI technologies and architectures, 2006.

Leong W Y et al: "Blind Mulituser Receiver in Rayleign Fading Channel" Communications Theory Workshop, 2005, Proceedings, 6th Australian Brisbane AUS Feb. 2-4, 2005, Piscataway, NJ, IEEE Feb. 2, 2005 pp. 155-161.

Potter M. et al: "Competing ICA techniques in biomedical signal analysis" Electrical and Computer Engineering, 2001. Canadian conference on May 13-16, 2001 Piscataway, NJ, IEEE May 13, 2001 pp. 987-992.

Siow Yong Low et al: "Spatio-temporal processing for distant speech recognition" Acoustics, speech and signal processing, 2004. Proceedings (ICASSP pr) IEEE International Conference on Montreal, Quebec, Canada May 17-21, 2004, Piscataway, NJ, US, IEEE, vol. 1, May 17, 2004, pp. 1001-1004.

Vrins F. et al: "Improving independent component analysis performances by variable selection" Neural networks for signal processing, 2003. NNSP'03, 2003 IEEE 13th Workshop on Toulouse, France, Sep. 17-19, 2003, Piscataway, NJ, IEEE, Sep. 17, 2003, pp. 359-368.

Ran Lee et al: "Methods for the blind signal separation problem" Neural Networks and Signal Processing, 2003. Proceedings of the 2003 International Conference on Nanjing, China, Dec. 14-17, 2003, Piscataway, NJ, US, IEEE, vol. 2, Dec. 14, 2003, pp. 1386-1389.

International Search Report, PCT/US2007067044, International Search Authority European Patent Office, Sep. 3, 2007.

Samir Gupta et al: "Multiple Microphone Voice Activity Detector," U.S. Appl. No. 11/864,897. Filed Sep. 28, 2007.

A. Hyvarinen, J. Karhunen and E. Oja, Independent Component Analysis, John Wiley & Sons, NY, 2001.

A. Macovski, Medical Imaging, Chapter 10, pp. 205-211, Prentice-Hall, Englewood Cliffs, New Jersey, 1983.

B. D. Van Veen, "Beamforming: A versatile approach to spatial filtering," IEEE Acoustics, Speech and Signal Processing Magazine, pp. 4-24, Apr. 1988.

G. Burel, "Blind separation of sources: A nonlinear neural algorithm," Neural Networks, 5(6):937-947, 1992.

Griffiths, L. et al. "An Alternative Approach to Linearly Constrained Adaptive Beamforming." IEEE Transactions on Antennas and Propagation, vol. AP-30(1):27-34. Jan. 1982.

J. B. Maj, J. Wouters and M. Moonen, "A two-stage adaptive beamformer for noise reduction in hearing aids," International Workshop on Acoustic Echo and Noise Control (IWAENC), pp. 171-174, Sep. 10-13, 2001, Darmstadt, Germany.

Kuan- Chieh Yen et al: "Lattice- ladder decorrelation filters developed for co-channel speech separation", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY : IEEE, US, vol. 1, May 7, 2001, pp. 637-640, XP010802803, DOI: DOI:10.1109/ICASSP.2001.940912 ISBN: 978-0-7803-7041-8.

Kuan- Chieh Yen et al: "Lattice- ladder structured adaptive decorrelation filtering for co-channel speech separation", Acoustics, Speech, and Signal Processing, 2000. ICASSP '00. Proceeding S. 2000 IEEE International Conference on Jun. 5-9, 2000, Piscataway, NJ, USA,IEEE, vol. 1,Jun. 5, 2000, pp. 388-391, XP010507350, ISBN: 978-0-7803-6293-2.

M. I. Skolnik, Introduction to Radar Systems, McGraw-Hill, New York, 1980.

N. Owsley, in Array Signal Processing, S. Haykin ed., Prentice-Hall, Englewood Cliffs, New Jersey, 1985.

O. L. Frost, "An algorithm for linearly constrained adaptive array processing," Proc. IEEE, vol. 60, No. 8, pp. 926-935, Aug. 1972.

P. M. Peterson, N. I. Durlach, W. M. Rabinowitz and P. M. Zurek, "Multimicrophone adaptive beamforming for interference reduction in hearing aids," Journal of Rehabilitation R&D, vol. 24, Fall 1987.

Pan, Qiongfeng; Aboulnasr, Tyseer: "Combined Spatiau Beamforming and Time/Frequency Processing for Blind Source Separation"!3. European Signal Processing Conference, 4.-8.9. 2005, Antalya Sep. 8, 2005, Retrieved from the Internet:URL:http://www.eurasip.org/Proceedings/Eusipco/Eusipco2005/defevent/papers/cr1353.pdf [retrieved on Jun. 4, 2009].

R. T. Compton, Jr., "An adaptive array in spread spectrum communication system," Proc. IEEE, vol. 66, pp. 289-298, Mar. 1978.

Wu, B. "Voice Activity Detection Based on Auto-Correlation Function Using Wavelet Transform and Teager Energy Operator," Computational Linguistics and Chinese Language Processing, vol. 11, No. 1, Mar. 2006, pp. 87-100.

Kristjansson, Trausti., et al., "Voicing features for robust speech detection", In Interspeech- 2005, 369-372.

* cited by examiner

APPARATUS AND METHOD OF NOISE AND ECHO REDUCTION IN MULTIPLE MICROPHONE AUDIO SYSTEMS

CROSS-RELATED APPLICATIONS

This application relates to co-pending application "Enhancement Techniques for Blind Source Separation", commonly assigned U.S. patent application Ser. No. 11/551,509, filed Oct. 20, 2006, and co-pending application "Multiple Microphone Voice Activity Detector" Ser. No. 11/864,897, co-filed with this application.

BACKGROUND

1. Field of the Invention

The disclosure relates to the field of audio processing. More particularly, the disclosure relates to acoustic echo cancellation and noise reduction in multiple microphone audio systems.

2. Description of Related Art

Mobile speech communication can be conducted under various environments. The microphones on the mobile device receive not only the desired speech, but also background noise. In many situations, background noise can be abundant. It reduces intelligibility of desired speech. Acoustical echo is another problem in mobile speech communications. Not only it reduces desired speech's intelligibility, it also distracts the far end talk and is very annoying. To improve intelligibility of desired speech, it is necessary to reduce background noise and acoustic echo without distorting the desired speech. Many echo and noise reduction methods have been developed.

Traditionally, noise suppression is achieved using only one microphone. One of such noise suppression methods uses spectral subtraction to suppress background noise. The method assumes that the background noise is short-term stationary, i.e. the noise statistics do not change in a short period regardless the activity of the desired speech. Noise statistics are estimated when a desired speech signal is absent and the noise estimates are used to suppress noise in the signal regardless of the activity of desired speech. Spectral subtraction estimates noise statistic and suppress noise in the frequency domain. Each frequency bin is processed independently. This method finds success in stationary noise reduction. However, it is not capable of reducing non-stationary noise.

Another single-microphone noise reduction method uses a directional microphone. Usually, uni-directional microphones are more expensive than omni-directional microphones. Also, uni-directional microphones may limit the way the speech communications devices are used since the mobile device may need to be placed properly to ensure its functionality.

Echo cancellation is typically achieved by de-correlating microphone signal from far end signal using adaptive filtering. Some aggressive echo cancellation algorithms reduce communication into half-duplex mode, where only one user talks at a time. In mobile speech communication, background noise and acoustic echo reduce intelligibility of desired speech. Therefore, it is desirable to reduce both background noise and echo without distorting desired speech.

BRIEF SUMMARY

Multiple microphone noise and echo reduction apparatus and methods are described herein. The apparatus and methods implement a variety of noise and echo reduction techniques and apparatus that can be selectively applied to signals received using multiple microphones. The microphone signals received at each of the multiple microphones can be independently processed to cancel acoustic echo that can be generated due to acoustic or mechanical coupling. The echo cancelled signals may be processed by some or all modules within a signal separator that operates to separate or otherwise isolate a speech signal from noise signals. The signal separator can optionally include a pre-processing de-correlator followed by a blind source separator. The output of the blind source separator can be post filtered to provide post separation de-correlation. The separated speech and noise signals can be non-linearly processed for further noise reduction, and additional post processing can be implemented following the non-linear processing.

Aspects of the invention include a method of noise reduction in multiple microphone communication devices. The method includes receiving multiple microphone signals, de-correlating the multiple microphone signals, separating a speech signal component from a noise signal in at least one of the multiple microphone signals to generate separated microphone signals, and performing non-linear noise suppression on a speech reference signal of the separated microphone signals.

Aspects of the invention include a method of noise reduction in multiple microphone communication devices. The method includes receiving a first microphone signal, receiving a second microphone signal, performing echo cancellation on each of the first microphone signal and the second microphone signal, de-correlating the first microphone signal from the second microphone signal, separating a speech reference signal from a noise reference signal based on the first and second microphone signals, de-correlating a residual noise in the speech reference signal from the noise reference signal, and performing non-linear processing on at least the speech reference signal.

Aspects of the invention include an apparatus for noise reduction in multiple microphone systems. The apparatus includes a first echo canceller configured to cancel an echo in a first microphone signal to generate a first echo canceled microphone signal, a second echo canceller configured to cancel an echo in a second microphone signal to generate a second echo canceled microphone signal, a signal separator configured to receive the first and second echo canceled microphone signals and separate a speech signal component from a noise signal component to generate a speech reference signal and a noise reference signal, and a non-linear processing module configured to receive the speech reference signal and noise reference signal and perform non-linear processing on the speech reference signal.

Aspects of the invention include an apparatus for noise reduction in multiple microphone systems. The apparatus includes means for receiving multiple microphone signals, means for de-correlating the multiple microphone signals, means for separating a speech signal component from a noise signal in at least one of the multiple microphone signals to generate separated microphone signals, and means for performing non-linear noise suppression on a speech reference signal of the separated microphone signals.

Aspects of the invention include a processor readable media including instructions that may be utilized by one or more processors. The instructions include instructions for de-correlating multiple received microphone signals, instructions for separating a speech signal component from a noise signal in at least one of the multiple received microphone signals to generate separated microphone signals, and instructions for performing non-linear noise suppression on a speech reference signal of the separated microphone signals.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

In the present disclosure, a two-microphone noise and echo reduction system is described. It uses two microphones to receive acoustic signals, such as speech signals. Each microphone receives a different mixture of desired speech, background noise and acoustic echo.

The noise suppression system uses echo cancellers to reduce acoustic echo in each of the microphone signals. The signal after echo cancellation is fed to an enhanced Blind Source Separation (BSS) module, which substantially separates desired speech signal components from background noise and residual acoustic echo. Then, nonlinear noise and echo reduction is used to further reduce background noise and acoustic echo in the desired speech signal. Post-processing is used to further reduce residue noise and echo.

Figure 1:
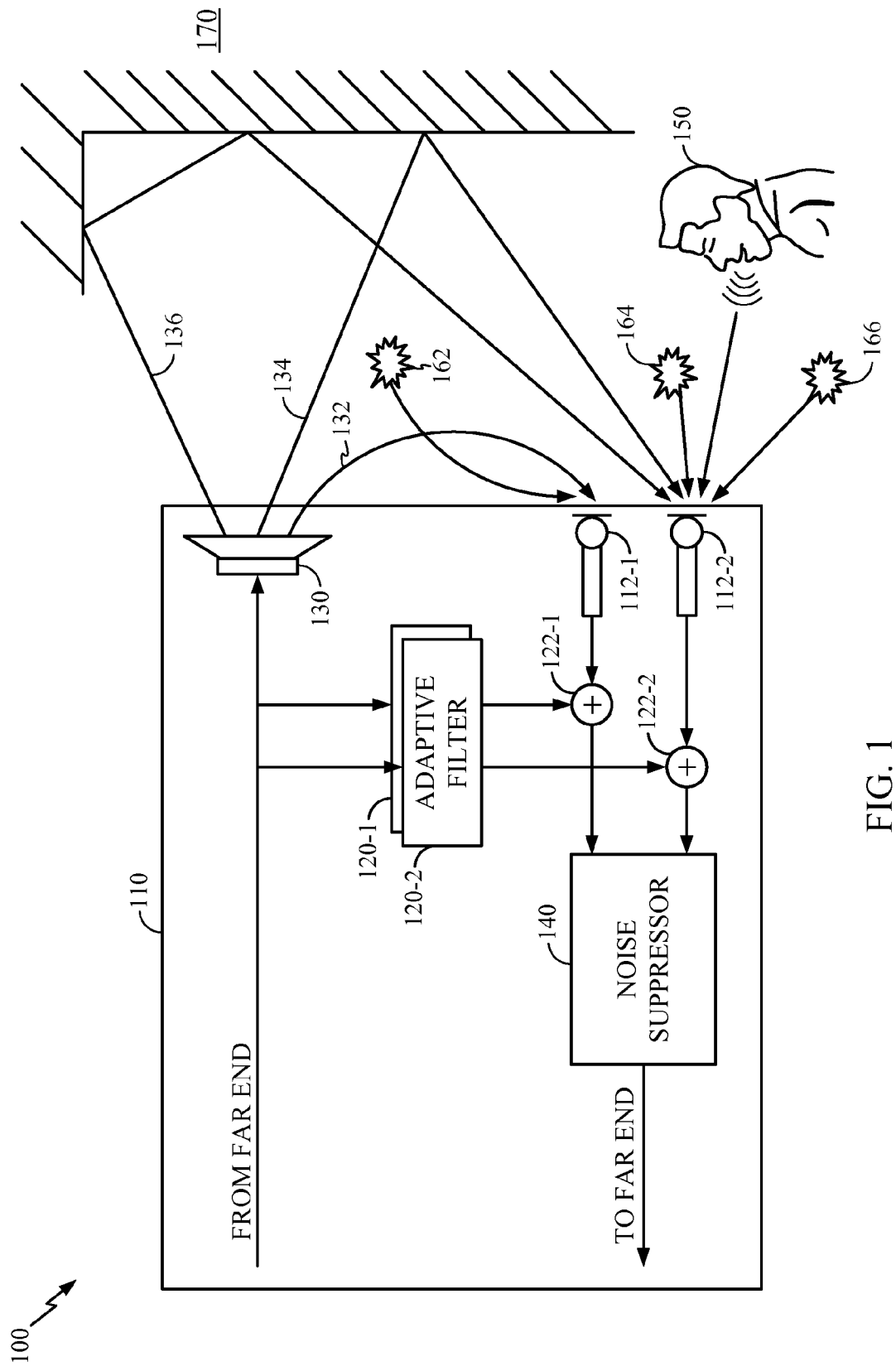
FIG. 1 is simplified functional block diagram of an environment having background noise and acoustic echo in speech communication and a noise suppressor and a typical echo canceller based on an adaptive filter.

FIG. 1 is a simplified functional block diagram of an embodiment of a reverberant noise environment 100 in which a communication device 110 operates. The communication device 110 can be, for example, a mobile device, portable device, or stationary device. For example, the communication device 110 can be a mobile telephone, personal digital assistant, notebook computer, sound recorder, headsets, and the like or some other communication device that can receive and process audio signals and optionally output audio signals. The communication device 110 illustrated in FIG. 1 includes multiple microphones 112-1 and 112-2 and at least one audio output device 130.

The audio environment can include multiple noise and interference sources, e.g. 162, and can include one or more near end speech sources 150. For example, a single near end speech source 150 can be a user of the communication device 110. Typically, the speech source 150 is positioned in the near field of the microphones 112-1 and 112-2.

A number of noise sources 162, 164, and 164 may generate signals incident on the microphones 112-1 and 112-2. The noise sources, 162, 164, and 166 may be positioned throughout the operating environment, as shown in FIG. 1, or one or more noise sources may be positioned close together. Typically, each of the noise sources 162, 164, and 166 is positioned in the far field of the microphones 112-1 and 112-2. The noise sources 162, 164, and 166 can be independent noise sources or can be related noise sources.

The speaker 130 local to the communication device 110 can originate one or more echo signals, 132, 134, and 136. An echo signal 132 may traverse substantially a direct path from the speaker 132 to the microphones 112-1 and 112-2. An echo signal may traverse a reflected path 134, where the audio from the speaker 130 reflects off of a surface 170. The echo signal may also traverse a multiply reflected path 136, where the audio from the speaker reflects off of multiple surfaces 170 prior to reaching the microphones 112-1 and 112-2.

Although the signal path from each of the noise sources 162, 164, and 166 is depicted as a single path, the signal from each noise source 162, 164, and 166 may traverse multiple paths. Thus, the signal incident on the microphones 112-1 and 112-2 may include multiple signals, including some signals that traverse multiple paths before arriving at the microphones 112-1 and 112-2.

The position of the speech source 150 in the near field of the microphones 112-1 and 112-2 may permit its signal to be more prevalent at some of the microphones 122-1 or 112-2. However, the small physical size of typical mobile communication devices 110 may not permit isolation of the speech source 150 signal from a portion of the microphones 112-1 and 112-2 through physical placement alone in order to establish a noise reference signal.

The position of speaker 130 may cause its signal to be a near field signal, although one or more of the reflected signals may appear as far field signals. The noise sources 162, 164, and 166 may be in the far field and their noise signal levels may be similarly on all microphones 112-1 and 112-2.

The communication device 110 utilizes a combination of echo cancellation and noise suppression to reduce the noise signals and echo signal from the speech signal. The resultant speech signal can be coupled to one or more far end processors or outputs.

The microphones 112-1 and 112-2 couple the received signals to respective signal combiners 122-1 and 122-2 that operates as part of, or in conjunction with, adaptive filters 120-1 and 120-2 to cancel at least a predominant echo signal that originates from the speaker 130. The adaptive filter receives an input signal that is substantially the same as the signal coupled to the speaker 130.

The output of the adaptive filters 120-1 and 120-2 may be coupled to a second input of the respective signal combiner 122-1 and 122-2. The signal combiners 122-1 and 122-2 can be configured as a summer or subtracter. The signal combiners 122-1 and 122-2 sum the filtered signal or a negated filtered signal to the signal from the microphones 112-1 and 112-2.

The adaptive filters 120-1 and 120-2 can be configured to converge on a set of tap weights that minimizes the echo signal component in the signal combiner 122-1 and 122-2 outputs. The outputs from the signal combiners 122-1 and 122-2 can be fed back to the associated adaptive filter 120-1 or 120-2 and used to determine an error or metric related to minimizing the echo signals.

The output of the signal summers 122-1 and 122-2 represent the echo canceled input signals. The echo canceled input signals may be coupled to a noise and echo suppressor 140. The noise and echo suppressor 140 can be configured to reduce noise signals and echo signals from the speech signals and may perform suppression of the noise component in order to optimize or otherwise enhance the speech component.

Figure 2:
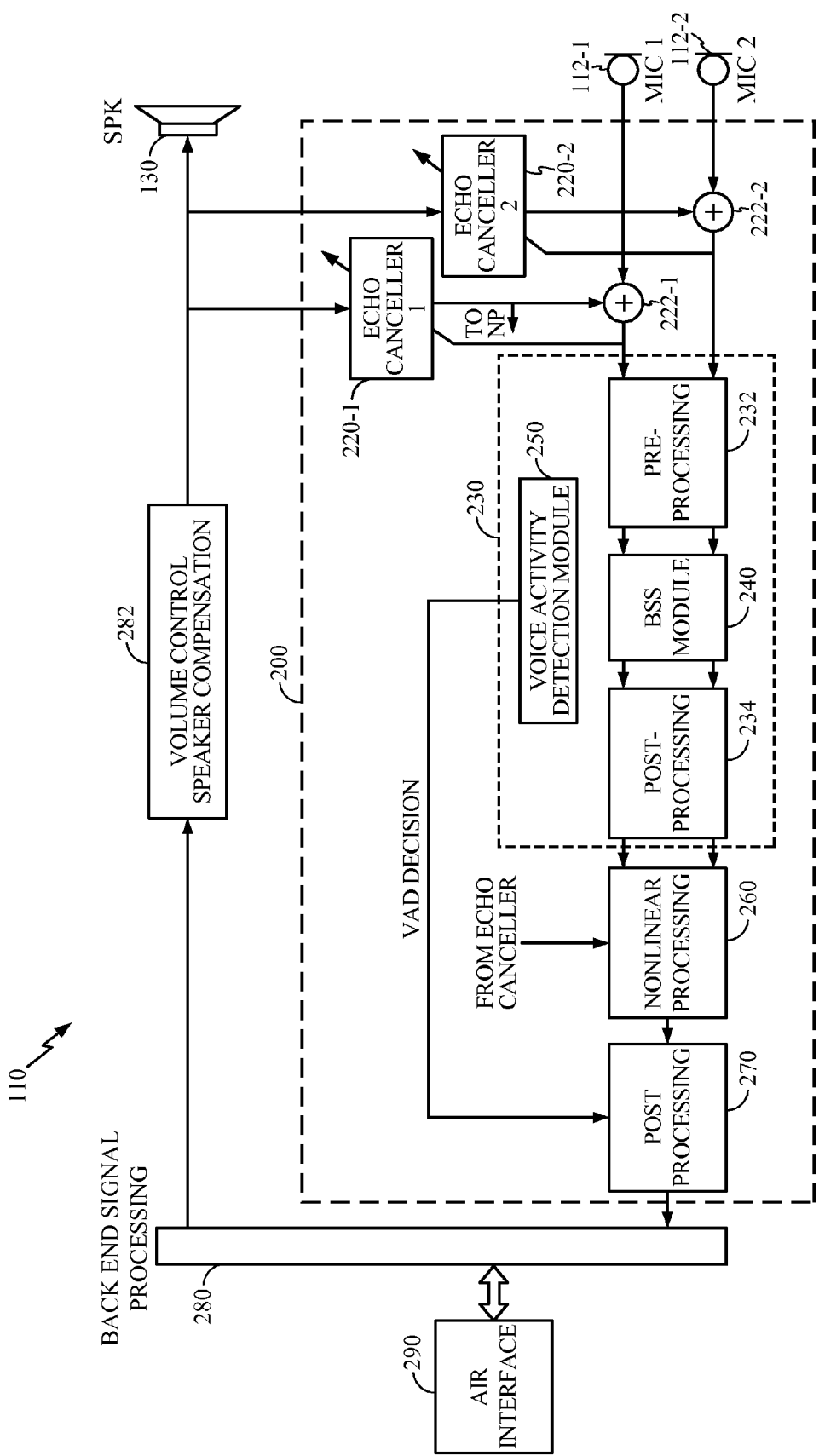
FIG. 2 is a simplified functional block diagram of an embodiment of a two-microphone noise and echo reduction system.

Embodiments illustrating details and operation of the noise and echo suppressor are described in association with FIG. 2. The speech signal output from the noise and echo suppressor 140 is coupled to one or more far end devices or modules (not shown) for further processing, output, or some combination thereof.

FIG. 2 is a simplified functional block diagram of an embodiment of communication device 110 implementing a two-microphone noise and echo reduction system. Although the communication device 110 embodiment illustrates two microphones 112-1 and 112-2, the noise suppression methods and apparatus can similarly operate on a greater number of microphones.

The communication device 110 includes two microphones 112-1 and 112-2 coupled to an input of a noise and echo reduction system 200. The noise and echo reduction system 200 is configured to remove echo signals from the received audio signals, separate the speech from the noise components, and further improve the speech signal by reducing the residual noise and echo.

The output of the noise and echo reduction system 200 is typically a speech reference signal, but can include a noise reference signal. The output signals may be coupled to a back end signal processing module 280, which can be, for example, a baseband signal processor of a wireless communication device. The back end signal processing module 280 can be configured to couple some or all of the speech reference signal to an air interface 290, which can be configured to process the speech signal to generate a signal in accordance with a media access control standard and a physical layer standard for wireless transmission over a link.

The communication device 110 may support duplex communication over the air interface 290 and may be configured to receive one or more communication signals that include speech signals for output by the communication device 110. The signals received by the air interface 290 may be coupled to the backend signal processing module 280.

The back end signal processing module 280 processes the received signals to extract and condition the speech and audio signals in the received signals. The back end signal processing module 280 couples the speech and audio portions to a volume control module 282 that can be configured, for example, to provide user configurable gain. The volume control module 282 can also be configured to provide filtering. In general, the signal processing modules within the noise and echo reduction system 200 may be implemented as analog signal processing modules, digital signal processing modules, or a combination of analog and digital signal processing. Where a module performs digital signal processing, an Analog to Digital Converter (ADC) is implemented at some signal processing point prior to digital processing. Similarly, where analog signal processing occurs following a digital signal processing module, a Digital to Analog Converter (DAC) is used to convert digital signals to their analog representations. As an example, the speaker 130 can include a DAC where the volume control module 282 outputs a digital signal.

The volume control module 282 couples the amplified and conditioned output audio signal to the input of the speaker and to at least one input of the noise and echo reduction system 200. The speaker 130 converts the output audio signal from an electrical signal to an audible signal. The noise and echo reduction system 200 utilizes the output audio as an input to one or more echo cancellers 220-1 and 220-2.

As described earlier, each of the microphones 112-1 and 112-2 may receive echo signals that are based on the signal output by the speaker 130. The acoustic echo reduces speech intelligibility and may also substantially hinder separation of the speech and noise signal components when the echo is strong. The echo is substantially eliminated, canceled, or otherwise reduced before signal separation to prevent the acoustic echo from confusing speech separation portions of the noise and echo reduction system 200.

One echo canceller is included for each microphone signal. A first microphone 112-1 couples its received signal to a first input of a first signal combiner 222-1. The first echo canceller 220-1 couples the echo cancellation signal to a second input of the first signal combiner 222-1. Similarly, the second microphone 112-2 couples its received signal to a first input of a second signal combiner 222-2. The second echo canceller 220-2 couples the echo cancellation signal to a second input of the second signal combiner 222-2.

One of the first or second echo cancellers 220-1 and 220-2 can be configured to couple its respective echo cancellation signal to an input of a nonlinear processing module 260. In the embodiment of FIG. 2, the first echo canceller 220-1 is configured to couple its echo cancellation signal to the nonlinear processing module 260.

Each signal combiner 222-1 and 222-2 can negate the signal from the respective echo canceller 220-1 and 220-2 before summing with the corresponding microphone signal. Each signal combiner 222-1 and 222-2 outputs an echo canceled signal. The first signal combiner 222-1 couples the first echo canceled signal to a first input of a signal separator 230 and to a feedback input of the first echo canceller 220-1. The second signal combiner 222-2 couples the second echo canceled signal to a second input of the signal separator 230 and to a feedback input of the second echo canceller 220-2.

Because there are linear signal processing modules after echo cancellation, each echo canceller 220-1 and 220-2 implements linear echo cancellation. For example, each echo canceller 220-1 and 220-2 can implement an adaptive filter. More particularly, each echo canceller 220-1 and 220-2 can use a normalized least mean square (NLMS) algorithm to minimize the echo signal component in the echo canceled signal.

The performance of echo cancellers, e.g. 220-1 and 220-2, based on adaptive filters is limited by linearity of the echo path, including speaker and microphone and their related circuits, and reverberant environment. Echo cancellation performance is also limited by the length of the adaptive filter and the algorithm's capability to deal with echo path change and double talk in which both near end and far end talkers are speaking.

Although the echo cancellers 220-1 and 220-2 typically implement echo cancellation based on time domain processing of the microphone and speaker signals, one or more of the echo cancellers 220-1 and 220-2 can implement frequency domain and subband domain processing for echo cancellation. In such cases, the signals from a microphone, e.g. 112-1, may be transformed to frequency domain or subband domain. The echo canceller, e.g. 220-1 can implement an adaptive filter for each frequency bin or subband. The echo canceller, e.g. 220-1, can adjust the tap weights of each adaptive filter to minimize the echo signal component in the output of each frequency bin or subband.

After echo cancellation, part of the linear echo has typically been removed. The remaining linear echo and nonlinear echo can be treated as part of the background noise.

The signal separator 230 operates to generate a speech reference signal and a noise reference signal. The signal separator 230 embodiment illustrated in FIG. 2 includes a pre-processing module 232, a source separator 240, and a post processing module 234. The signal separator 230 may optionally include a voice activity detection module 250 that operates on the signal at the input, output, or an intermediate point within the signal separator 230. The voice activity detection module 230 may alternatively be implemented external and distinct from the signal separator 230.

For particular applications, it may not be necessary to use all the modules in the signal separator 230. In one example, only the BSS source separator 240 is used. In another example, all but the BSS source separator 240 is used. In a third example, the BSS source separator 240 and the post-filter module 234 are used. The signal separator 230 may implement a controller (not shown) that selectively activates or omits each of the signal processing modules within the signal separator 230, for example, depending on signal conditions, operating modes, external control, and the like.

On communication device 110, the microphones 112-1 and 112-2 may be placed very close to each other due to limited space. Often, the differences in the signals from each of the microphones 112-1 and 112-2 are very small. Therefore, the instantaneous correlation among microphone signals is very high. When instantaneous correlation is significant, a blind source separator may not perform adequately and may end to cancel the most prominent signal in both microphone signals for two-microphone applications. Sometimes, a blind source separator generates annoying tonal artifacts when operating on signals having high instantaneous correlation.

To prevent high instantaneous correlation among the signals from the microphones 112-1 and 112-2, the pre-processing module 232 de-correlates the signals. In one embodiment, the pre-processing module 232 is configured as a digital filter having a small number (fewer than about five) of taps. One to three taps may be sufficient, although a different number of taps may be used. If three taps are used, one tap can be designated to be non-causal.

As an example, the pre-processing module 232 can include an adaptive de-correlator, which can be implemented as an adaptive filter with a small number of taps. The adaptive de-correlator can adjust the tap weights in order to minimize correlation or other wise maximize de-correlation. The adaptive de-correlator can be configured to select among a predetermined tap weights, predetermined sets of tap weights and configurations, or can be configured to adjust each tap weight substantially continuously and independently of other tap weight adjustments. The pre-processing module 232 can also include a calibrator that scales the output of the de-correlator in order to speed up convergence of a subsequent blind source separator.

The pre-processing module 232 couples the de-correlated microphone signals to a source separator 240 that can perform filtering based on, for example, Blind Source Separation (BSS). As stated above, mobile communication device 110 may be small in dimension. The small dimension not only limits the distance between microphones, but it also may limit the number of microphones that can be reasonably mounted on the communication device 110. Usually, two or, at most, three microphones are used. In general, this number of microphones does not meet the requirements for complete signal separation when there are multiple noise sources. In two-microphone configurations, as illustrated in FIG. 2, the BSS source separator 240 typically operates to separate the most prominent signal of all from all other signals. After echo cancellation, the desired speech may be expected to be the most prominent component of all signals. After signal separation, two signals are generated by the BSS source separator 240. One signal typically contains the most prominent signal and somewhat attenuated all other signals. Another signal contains all other signals and somewhat attenuated the most prominent signal.

Blind source separation (BSS), sometimes referred to as independent component analysis (ICA), is a method to reconstruct unknown signals based on their mixtures. These unknown signals are referred to as source signals. The adjective 'blind' has two folds of meaning. First, the source signals are not known or partially known. Only measurements of sources signal mixtures are available. Second, the mixing process is not known. Signal separation is achieved by exploring a priori statistics of source signals and/or statistics observed in signal measurements.

Early work regarding BSS can be found in many papers. For example, S. Choi, "Blind source separation and independent component analysis: A review," *Neural Information Processing—Letters and Review*, 6(1):1-57, January 2005, provides a comprehensive paper on BSS.

The assumption used to blindly separate signals is that all source signals are considered independent random variables, i.e. the joint distribution of all random variables is the product of that of individual random variables. This assumption can be formulated as:

$$P_{S_1,\ldots,S_m}(s_1,\ldots,s_m) = P_{S_1}(s_1)\ldots P_{S_m}(s_m),$$

where $P_{S_1,\ldots,S_m}(s_1,\ldots,s_m)$ is the joint probability density function (PDF) of all random variables $S_1, \ldots, S_m$ and $P_{S_1}(s_j)$ is the PDF of the jth random variable $S_j$.

Many BSS algorithms have been developed for differing applications. For example, a paper by K. Torkkola, "Blind separation of convolved sources based on information maximization," *IEEE workshop on Neural Networks for Signal Processing*, Kyoto, Japan, September 1996, described an algorithm to separate convolutive signals. In this algorithm, the scalar coefficients in the recurrent neural network are replaced by FIR filters. These filters are updated recursively using adaptive filtering algorithms during signal separation. M. Girolami, "Symmetric adaptive maximum likelihood estimation for noise cancellation and signal separation," *Electronics Letters*, 33(17):1437-1438, 1997, describes a similar algorithm for blind source separation. The algorithms described in the cited papers do not represent an exhaustive list of the literature describing BSS, but are provided to illustrate typically BSS algorithms that may be implemented by the source separator 240.

The lengths of the filters inside the BSS source separator 240 can range, for example, from 5 taps to 60 taps. The tap length of the BSS source separator is not a limitation, but rather, is selected based on a tradeoff of factors, including convergence time and steady state performance.

After signal separation, a post-processing module 234 may be used to further improve the separation performance by de-correlating the separated signals. Because only one signal from the source separator 240, the signal having the desired speech, is of interest, the post processing module 234 may implement only one post-filter. The post processing module 234 can filter the signal having the speech component and may perform no additional processing of the signal substantially representative of the noise component. The length of the post-filter can be configured, for example, to be longer than that of each of the two filters in the BSS source separator 240.

Two signal remain after signal separation and post processing. One signal contains primarily background noise and residual echo, in which the desired speech has been reduced. This signal is referred to as the noise reference signal. The other signal contains the desired speech signal and attenuated or otherwise reduced noise, interference, and echo signal components. This signal is referred to as the speech reference signal.

The signal separator 230 can include a voice activity detection module 250 that makes a voice activity detection decision based on the speech reference signal and noise reference signal. Voice activity detection module 250 may be coupled to the signals at the output of the signal separator 230, because these signals exhibit the greatest differential of speech and noise. However, the voice activity detection module 250 can make the voice activity decision based on the two signals at the output of any of the intermediate modules within the signal separator 230.

In other embodiments, the voice activity detection module 250 can be implemented external to the signal separator 230, and may operate on the signals at the output of the signal separator 230. In other embodiments, the signal separator 230 can provide access to some or all of the intermediate signal outputs, and the voice activity detection module 250 can be coupled to the signal separator 230 output or an intermediate output. The voice activity detection indication can be used by a subsequent signal processing module, as described below, to modify the signal processing performed on the speech or noise signals.

The signal separator 230 couples the speech reference signal and noise reference signal to a nonlinear processing module 260. As described earlier, the first echo canceller 220-1 may couple the echo cancellation signal to the nonlinear processing module 260. After signal separation, the speech reference signal still contains residual background noise and acoustic echo, whose correlation with noise reference signal is typically low due to the post-processing module 234 inside the signal separator 230. Therefore, it is typically not possible to use linear filtering to remove residual noise and echo from the speech reference signal. However, the residual noise and echo still may have some similarity to the noise reference signal. The spectral amplitude of the residue noise and echo may be similar to that of the noise reference signal. When similar, this similarity can be exploited to further reduce noise in the speech reference signal using nonlinear noise suppression techniques.

As an example, the nonlinear processing module 260 can implement spectral subtraction to further suppress residual noise and echo. In a dual-microphone noise and echo reduction application, such as shown in FIG. 2, the noise statistics can be estimated based on the noise reference signal and echo cancellation signal. The estimated noise statistics cover non-stationary noise, stationary noise as well as residual acoustic echo. The estimated noise statistics based on the noise reference signal are typically considered more accurate than noise estimates based on one microphone signal. With more accurate noise statistics, spectral subtraction is capable of performing better noise suppression. Dual-microphone spectral subtraction suppresses not only stationary noise but also non-stationary noise and residual acoustic echo.

After spectral subtraction or some other nonlinear processing, there typically is still residue noise and echo in the speech reference signal. The nonlinear processing module 260 couples at least the speech reference signal to a post processing module 270 for further noise shaping.

The residue noise can be further reduced or masked in the post-processing module 270. The post-processing module 270 can be configured to perform, for example, center clipping, comfort noise injection, and the like. The post-processing methods can be any one or combination of commonly used speech communications processing techniques.

The post processing module 270 can implement center clipping to apply different gains to signals at different level. For example, the gain can be set to be unity when signal level is above a threshold. Otherwise, it is set to be less than unity.

In one embodiment, the prost processing module 270 assumes that the signal level is low when there is no desired speech. However, this assumption may fail in a noisy environment where the background noise level can be higher than the threshold.

In an alternative embodiment, the post processing module 270 applies center clipping based in part on the presence of desired speech. The post processing module 270 receives the voice activity decision from the voice activity detection module 250. The post processing module 270 can apply center clipping in the presence of voice activity. Thus, the post processing module 270 selectively applies center clipping based on the voice activity state.

The post processing module 270 may also use the voice activity state to selectively apply comfort noise injection. The post processing module 270 may be configured to selectively quiet the voice channel when there is an absence of voice activity. The post processing module may, for example, decrease the gain applied to the speech reference signal or decouple the speech reference signal from subsequent stages when the voice activity detection module 250 indicates with the voice activity state a lack of voice activity. The lack of any significant signal may be disconcerting to a listener, as the listener may wonder if the communication device 110 has dropped the communication link. The post processing module 270 can insert a low level of noise in the absence of speech, referred to as "comfort noise" to indicate or otherwise reassure a listener of the presence of the communication link.

The post processing module 270 output represents the output of the noise and echo reduction system 200. The processed speech reference signal is coupled to the back end processing module 280 such as a speech encoder or an audio encoder. If desired, the post processing module 270 may also couple the noise reference signal to subsequent stages, although seldom is this necessary.

Figure 3A:
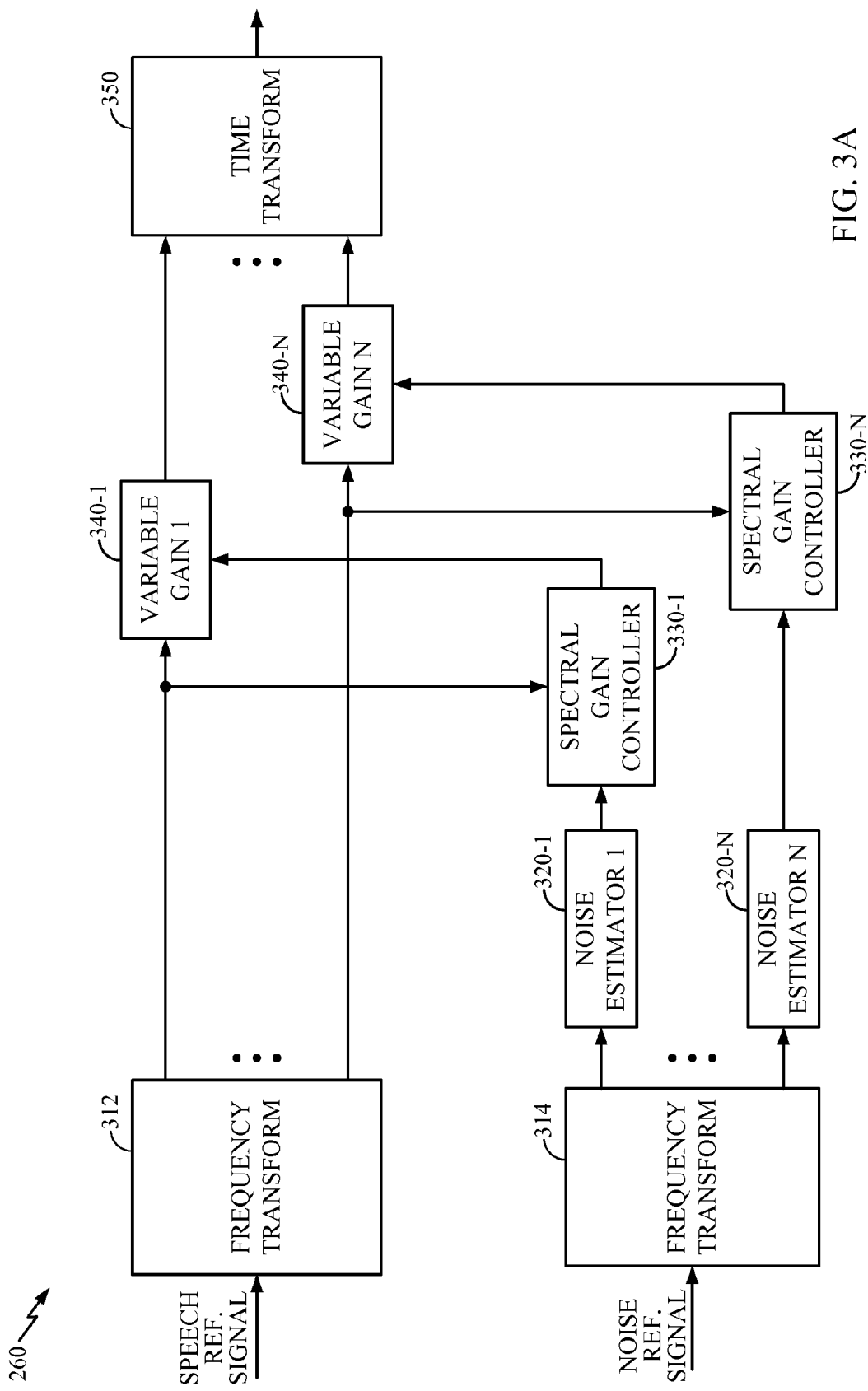
FIGS. 3A-3B are simplified functional block diagrams of embodiments of non-linear processing modules implementing spectral subtraction.

FIG. 3A is a simplified functional block diagram of an embodiment of a non-linear processing module 260 implementing spectral subtraction. In the embodiment of FIG. 3A, the non-linear processing module 260 transforms the speech reference signal to the frequency domain and performs frequency selective gain, where the frequency selectivity is based on the number of frequency bins or subbands in the frequency domain. The embodiment of FIG. 3A can be used, for example, in the noise and echo reduction system 200 of FIG. 2.

The non-linear processing module 260 includes a first frequency transform module 312 configured to receive the speech reference signal and transform it to the frequency domain. The first frequency transform module 312 can be configured, for example, to accept a serial signal input and provide a parallel signal output, where each of the output signals is representative of signals within a particular frequency subband. The outputs of the first frequency transform module 312 may be coupled to frequency selective variable gain modules 340-1 to 340-N that are each configured to selectively apply a gain to corresponding frequency bins. For example, the first variable gain module 340-1 receives a first output from the first frequency transform module 312 and applies a controllable gain to the first frequency bin. The output of the variable gain modules 340-1 to 340-N may be coupled to a time transform module 350 configured to transform the frequency domain processed speech reference signal back to a time domain representation.

The non-linear processing module 260 also includes a second frequency transform module 314 configured to receive the noise reference signal and transform it to a frequency domain representation. The second frequency transform module 314 is illustrated as generating the same number of frequency bins as produced by the first frequency transform module 312.

The second frequency transform module 314 may couple the frequency domain representation of the noise reference signal to noise estimators 320-1 to 320-N. Each frequency bin output from the second frequency transform module 314 may be coupled to a distinct noise estimator, e.g. 320-1. The noise estimators 320-1 to 320-N can be configured to estimate the noise within its associated frequency bin.

The noise estimators 320-1 to 320-N couple the noise estimate values to respective spectrum gain controllers 330-1 to 330-N. The spectrum gain controllers 330-1 to 330-N operate to vary the frequency selective gain of the variable gain modules 340-1 to 340-N based at least in part on the noise estimate values.

Each of the frequency transform modules 312 and 314 can be configured to perform the frequency transform as a Discrete Fourier Transform, Fast Fourier Transform, or some other transform. Typically, the first and second frequency transform modules 312 and 314 are configured to generate the same number of frequency bins, although that is not a limitation.

The noise estimators 320-1 to 320-N can be configured to determine a noise magnitude, noise power, noise energy, noise floor, and the like, or some other measure of noise within each frequency bin. The noise estimators 320-1 to 320-N can include memory (not shown) to store one or more previous noise estimates. The noise estimators 320-1 to 320-N can be configured to generate a time moving average or some other weighted average of noise.

The spectrum gain controllers 330-1 to 330-N can be configured to apply a gain to each of the frequency bins based on the value of the noise estimate and the corresponding speech reference signal within that frequency bin. In one embodiment, each of the spectrum gain controllers 330-1 to 330-N is configured to apply one of a predetermined number of gain values based on the noise estimate value and the corresponding speech reference signal. In another embodiment, each of the gain controllers 330-1 to 330-N can generate a substantially continuous gain control value based on the value of the noise estimate and the corresponding speech reference signal within a particular frequency bin. Discussions regarding the general concept of spectral subtraction, may be found in S. F. Boll, "Suppression of Acoustic Noise in Speech Using Spectral Subtraction," *IEEE Trans. Acoustics, Speech and Signal Processing*, 27(2): 112-120, April 1979.

The variable gain modules 340-1 to 340-N can be configured to apply an independent gain to each of the frequency bins based on the control value applied by the respective gain controller 330-1 to 330-N. For example, the first variable gain module 340-1 can be configured to apply a gain in the range of 0-1 to the corresponding frequency bin based on the gain control value associated with the frequency bin.

The time transform module 350 may be configured to perform substantially the complement of the process performed by the first frequency transform module 312. For example, the time transform module 350 can be configured to perform an Inverse Discrete Fourier Transform or an Inverse Fast Fourier Transform.

Figure 3B:
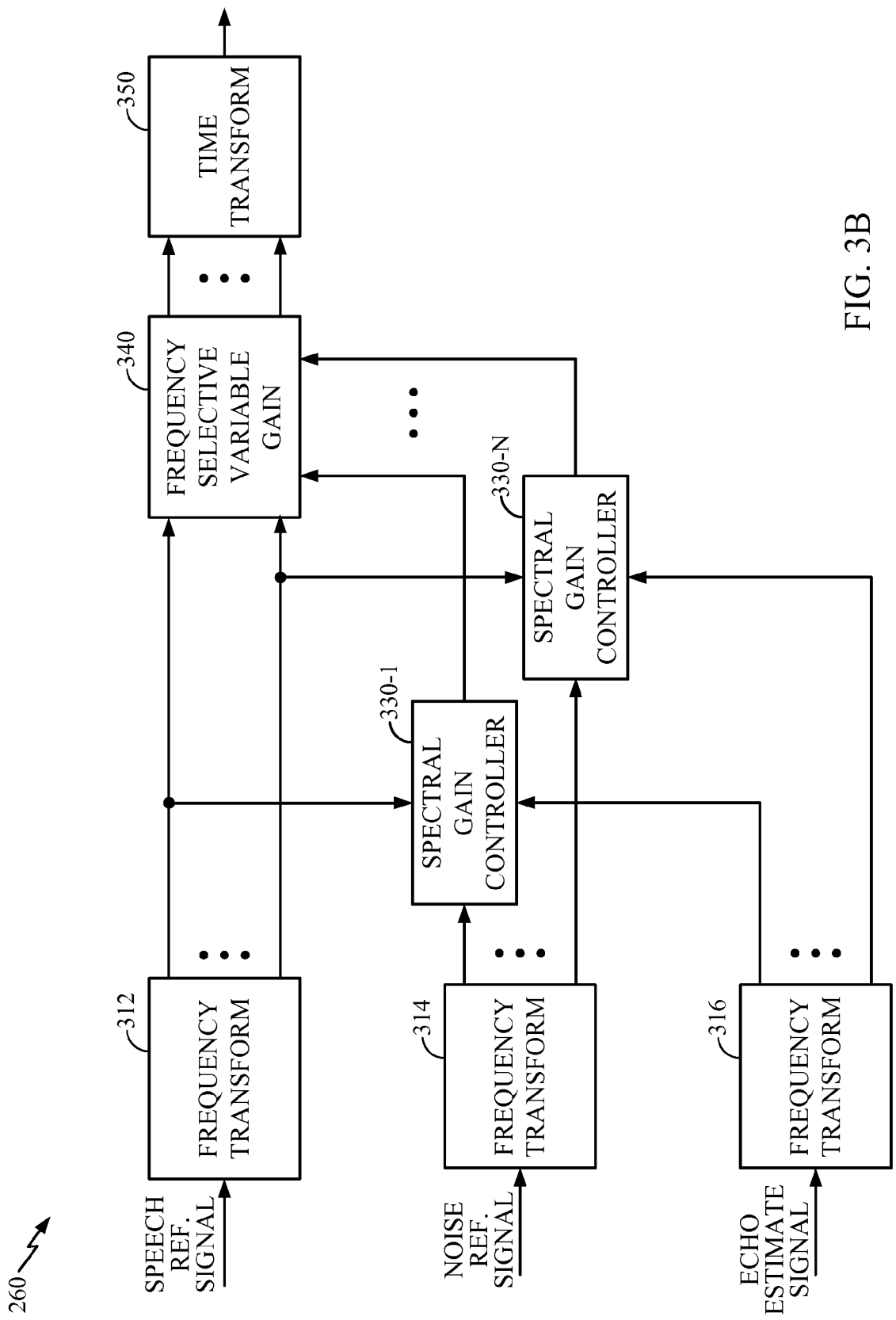

FIG. 3B is a simplified functional block diagram of another embodiment of a non-linear processing module 260 implementing spectral subtraction. In the embodiment of FIG. 3B, the non-linear processing module 260 transforms the speech reference signal to the frequency domain and performs frequency selective gain. The embodiment of FIG. 3B can be used, for example, in the noise and echo reduction system 200 of FIG. 2.

Similar to the embodiment shown in FIG. 3A, the non-linear processing module 260 embodiment of FIG. 3B includes a first frequency transform module 312 configured to receive the speech reference signal and transform it to the frequency domain. The first frequency transform module 312 can be configured to generate a parallel output having a predetermined number, N, of outputs, where each output corresponds to a frequency bin or band. For example, the first frequency transform module 312 can be configured as an N-point FFT.

The outputs from the first frequency transform module 312 may be coupled to a frequency selective variable gain module 340 that is configured to selectively apply a gain to each of the frequency bins. The outputs of the variable gain module 340 may be coupled to a time transform module 350 configured to transform the frequency domain processed speech reference signal back to a time domain representation.

Each of the frequency bin outputs may also be coupled to an input of a corresponding spectral gain controller 330-1 through 330-N. Each of the spectral gain controllers 330-1 through 330-N is configured to generate a gain control signal for its corresponding frequency bin. The gain control signal from each of the spectral gain controllers 330-1 through 330-N may be coupled to a gain control input of the variable gain module 340 associated with the corresponding frequency bin.

The non-linear processing module 260 also includes a second frequency transform module 314 configured to receive the noise reference signal and transform it to a frequency domain representation. Typically, the second frequency transform module 314 may be configured to output the same number of frequency bins, N, that are output from the first frequency transform module 312, but this is not an absolute requirement. Each output from the second frequency transform module 314, representing the noise in a corresponding frequency bin, may be coupled to an input of a corresponding spectral gain controller 330-1 through 330-N.

A third frequency transform module 316 may be configured to receive the echo estimate signal from an echo canceller, such as the first echo canceller shown in the system of FIG. 1. The third frequency transform module 31 may be configured to transform the echo estimate signal to a frequency domain representation, and typically transforms the echo estimate signal to the same number of frequency bins determined by the first and second frequency transform modules 312 and 314. Each output from the third frequency transform module 316, representing the echo estimate spectral component in a corresponding frequency bin, may be coupled to an input of a corresponding spectral gain controller 330-1 through 330-N.

Each spectral gain controller 330-1 through 330-N may be configured to process the speech reference spectral component, noise reference spectral component, and echo estimate spectral component for a particular frequency bin. Thus, the non-linear processing module 260 embodiment of FIG. 3B utilizes N distinct spectral gain controllers 330-1 through 330-N.

The noise and residual echo present in the speech reference signal may be similar to the noise reference signal and echo estimate signal. Each spectral gain controller 330-1 through 330-N can determine the level of similarity on an individual frequency bin basis to determine the level of gain control to apply to the frequency bin.

The output from each spectral gain controller 330-1 through 330-N may control the gain that the frequency selective variable gain module 340 applies to the corresponding frequency bin. Therefore, in the embodiment of FIG. 3B, the frequency selective variable gain module 340 can independently control the gain in N distinct frequency bins.

The outputs of the frequency selective variable gain module 340 may be coupled to a time transform module 350 for transform back to a time domain signal, as described in the embodiment of FIG. 3A.

Figure 4:
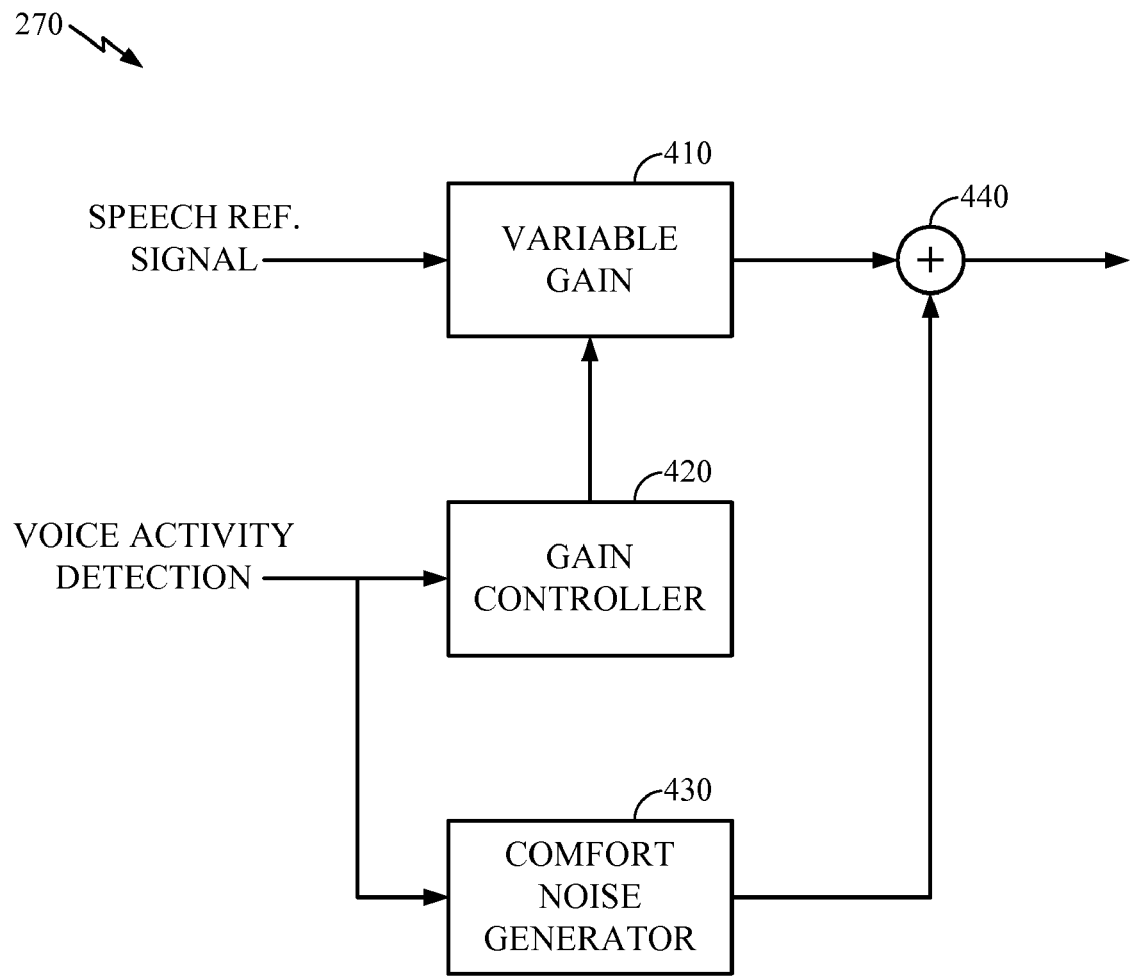
FIG. 4 is a simplified functional block diagram of an embodiment of a speech post-processing module.

FIG. 4 is a simplified functional block diagram of an embodiment of a speech post-processing module 270. The embodiment of FIG. 4 can be used, for example, in the noise and echo reduction system 200 of FIG. 2.

The speech post-processing module 270 is configured to provide both center clipping and comfort noise injection in the absence of voice activity. The post-processing module 270 includes a variable gain module 410 configured to receive the speech reference signal and apply a gain based at least in part on the voice activity state. The variable gain module 410 may couple the amplified/attenuated output to the first input of a signal combiner 440, illustrated as a signal summer.

The post-processing module 270 also includes a gain controller configured to receive the voice activity state from a voice activity detection module (not shown). The gain controller 420 may control the gain of the variable gain module 410 based in part on the voice activity state.

The gain controller 420 can be configured to control the gain of the variable gain module 410 to be unity or some other predetermine value if the voice activity state indicates the presence of voice activity. The gain control module 420 can be configured to control the gain of the variable gain module 410 to be less than unity or less than the predetermined value when the voice activity state indicates the absence of voice activity. In one embodiment, the gain control module 420 can be configured to control the gain of the variable gain module 410 to substantially attenuate the speech reference signal in the absence of voice activity.

A comfort noise generator 430 may receive the voice activity state as a control input. The comfort noise generator 430 can be configured to generate a noise signal, such as a white noise signal, that can be injected into the audio channel in the absence of voice activity.

Thus, the gain controller 420 and comfort noise generator 430 may each be active on complementary states of the voice activity decision. When the voice activity state indicates presence of voice activity, the post-processing module 270 may output substantially the speech reference signal. When the voice activity state indicates absence of voice activity, the post-processing module 270 may output substantially the comfort noise signal.

Figure 5:
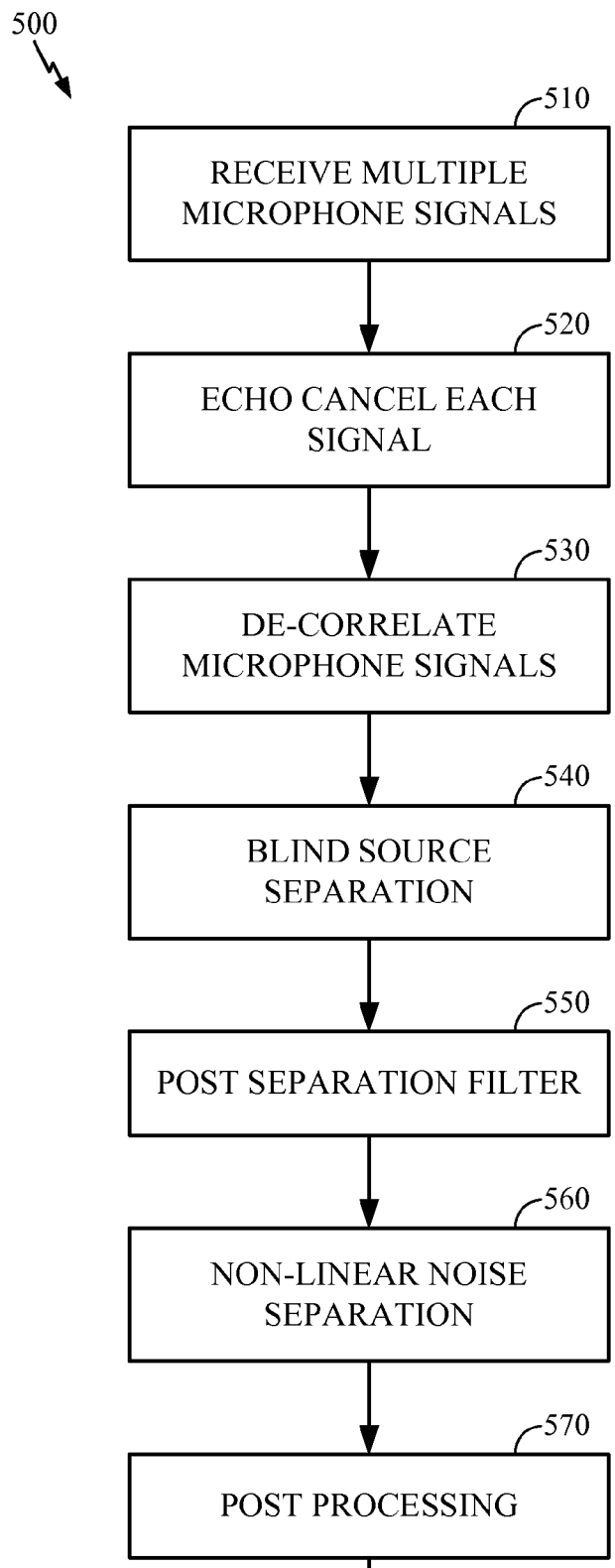
FIG. 5 is a simplified flowchart of an embodiment of a method of noise and echo reduction.

FIG. 5 is a simplified flowchart of an embodiment of a method 500 of noise and echo reduction. The method 500 can be performed by the communication device of FIG. 1 or 2 or by the noise and echo reduction system within the communication device of FIG. 2.

The method 500 begins at block 510 where the communication device receives multiple microphone signals, for example, from two distinct microphones. The communication device proceeds to block 520 and cancels the echo in each of the received microphone signals. The echo can be considered to be a signal that originates at the communication device that couples to the received microphone signal path. The coupling can be acoustic, mechanical, or can be electrical, via a coupling path within the communication device.

The communication device can be configured to independently cancel the echo in each microphone path, as the coupling of the echo signal to each of the paths is likely independent. The communication device can be configured to cancel the echo using an adaptive filter whose taps are varied to minimize a metric of the echo canceled signal. For example, each echo canceller can utilize a normalized least mean square (NLMS) algorithm to minimize the echo signal component in the echo canceled signal.

After canceling or otherwise reducing the echo signal component within the microphone signals, the communication device performs signal separation, where the speech signal component is separated or otherwise isolated from the noise signal component. The communication device proceeds to block 530 and de-correlates the microphone signals, for example, by passing at least one of the microphone signals through a linear filter. The linear filter can be an adaptive filter comprising a number of taps, but typically one to three taps are used. The tap weights can be adjusted to minimize the instantaneous correlation between two microphone signals. In other embodiments, the filter can be a fixed filter that is configured to de-correlate the two microphone signals.

The communication device proceeds to block 540 and separates the speech from the noise by performing Blind Source Separation (BSS) on the two microphone signals. The result of BSS may be two distinct signals, one having substantially the speech signal and the other having substantially the noise signal.

The communication device proceeds to block 550 and performs post separation processing by passing one of the speech signal or noise signal through a linear filter to de-correlate any residual noise remaining on the two signals.

The communication device proceeds to block 560 and performs non-linear noise suppression. In one embodiment, the communication device can be configured to perform spectral subtraction. The communication device can perform spectral subtraction by adjusting a frequency selective gain to the speech reference signal that operates, effectively, to reduce noise and residual echo in the speech reference signal.

The communication device proceeds to block 570 and performs any additional post processing of the speech reference signal that may be desired. For example, the communication device can perform center clipping and can perform center clipping based on the voice activity state. Similarly, the communication device can perform comfort noise injection and can inject the comfort noise signal in the absence of voice activity. The output of the post processing stage or stages represents the processed speech signal.

Figure 6:
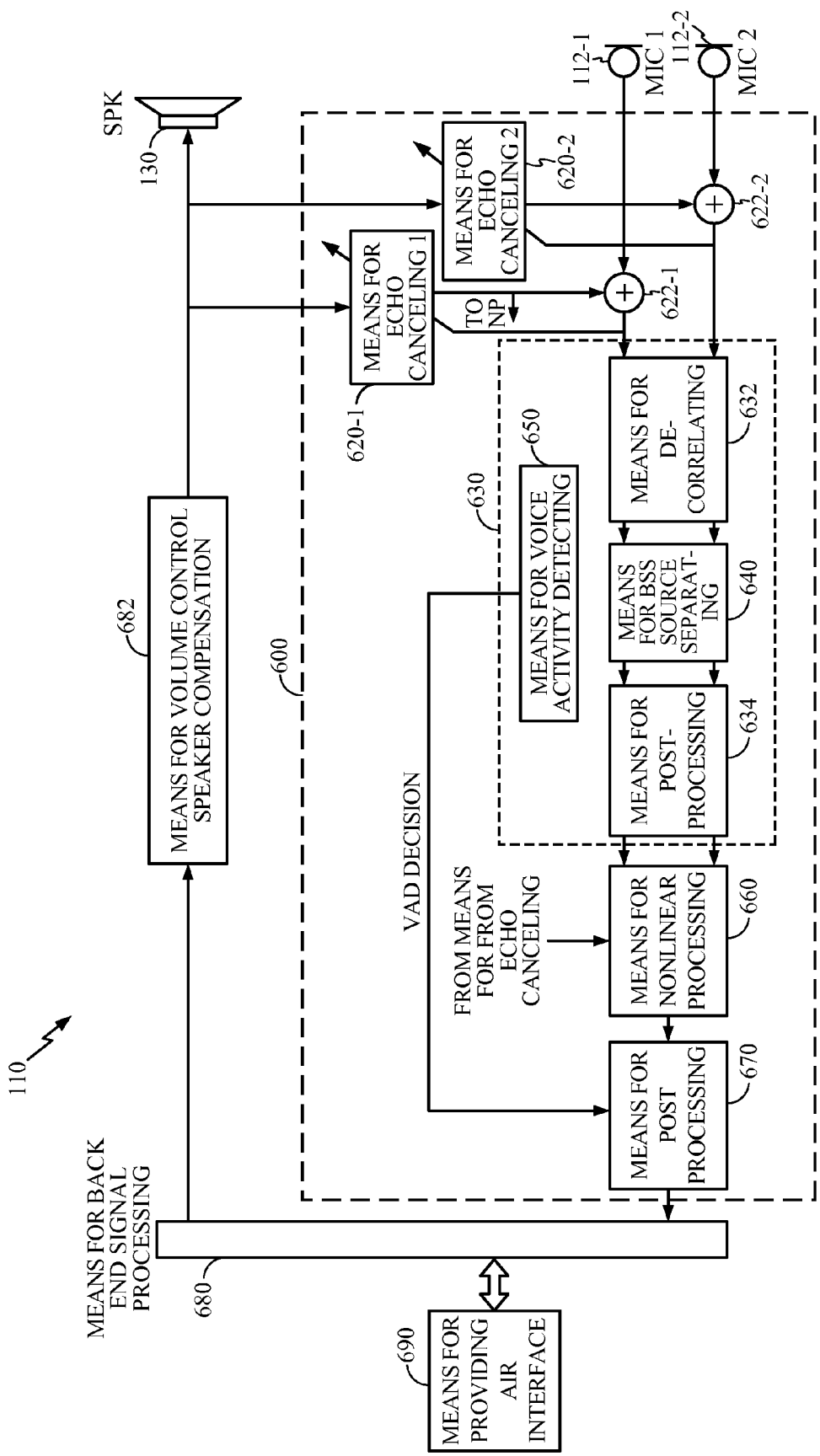
FIG. 6 is a simplified functional block diagram of an embodiment of a two-microphone noise and echo reduction system.

FIG. 6 is a simplified functional block diagram of an embodiment of communication device 110 implementing a two-microphone noise and echo reduction system. The communication device 110 includes two microphones 112-1 and 112-2 and a speaker 130 as in the embodiment of FIG. 2.

The communication device 110 includes a means for reducing noise and echo 600 configured as a means for receiving the multiple microphone signals. The means for reducing noise and echo 600 includes first and second means for performing echo cancellation 620-1 and 620-2 on each of the two microphone signals. Each of the means for performing echo cancellation 620-1 and 620-2 operates in conjunction with a corresponding means for combining signals 622-1 and 622-2.

The communication device 110 includes means for signal separation 630 that includes means for de-correlating the multiple microphone signals 632 that can be configured as an adaptive filter for de-correlating the first and second echo canceled microphone signals. The means for signal separation 630 further includes means for separating 640 a speech signal component from a noise signal in at least one of the multiple microphone signals to generate separated microphone signals that can be configured as a means for Blind Source Separating the speech signal component for the noise signal component. A means for post processing 634 in the means for signal separation 630 can be configured to de-correlate a residual noise signal in the speech reference signal from the noise reference signal.

The communication device 110 also includes means for performing non-linear noise suppression 660 on a speech reference signal of the separated microphone signals. The means for performing non-linear noise suppression 660 can be followed by a means for performing post processing 670 of the speech reference signal.

A means for voice activity detecting 650 may operate in conjunction with the means for performing post processing 670 and may determine and provide a voice activity state. The output of the means for reducing noise 600 may be coupled to a means for back end signal processing 680 which operates to process the speech reference signal and couple it to a means for providing an air interface 690.

Speech signals received by the means for providing an air interface 690 are coupled to the means for back end signal processing 680, which formats the signal for output. The output signal is coupled to a means for volume control and speaker compensation 682, which adjusts the amplitude of the signal to adjust the speaker volume. The output signal may be coupled to the speaker 130 as well as to each of the means for echo canceling 620-1 and 820-2.

Multiple microphone noise and echo reduction is presented in the context of a communication device. In the present disclosure, the emphasis is given to two-microphone noise and echo reduction applications. However, the principle can be generalized to multiple-microphone noise and echo reduction applications. In such cases, additional microphones are used and more adaptive echo cancellers may be needed as well. The BSS algorithm separates multiple mixed signals into multiple separated signals. Among all separated signals, typically only one signal, the speech reference signal, is of interest. All other signals are considered different version of noise reference signals. The various noise reference signals can be used to further reduce residue noise and echo in the speech reference signal.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Specifically, a circuit or a number of circuits may be used to implement the various steps or acts in a method or process. The circuits may all be part of an integrated circuit, or some of the circuit may be used outside an integrated circuit, or each circuit may be implemented as an integrated circuit. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of noise reduction in multiple microphone communication devices, the method comprising:
   receiving multiple microphone signals;
   de-correlating the multiple microphone signals;
   separating a speech signal component from a noise signal in at least one of the multiple microphone signals to generate separated microphone signals; and
   performing non-linear noise suppression on the speech signal component.

2. The method of claim 1, further comprising performing center clipping of the speech reference signal based on a voice activity state.

3. The method of claim 1, further comprising inserting comfort noise to the speech reference signal based on a voice activity state.

4. The method of claim 1, further comprising performing echo cancellation on each of the multiple microphone signals.

5. The method of claim 1, wherein de-correlating the multiple microphone signals comprises filtering at least one of the multiple microphone signals.

6. The method of claim 5, wherein filtering comprises at least one of filtering using a multi-tap filter having at least one non-causal tap or adaptive filtering the at least one of the multiple microphone signals.

7. The method of claim 1, wherein separating the speech signal component from the noise signal comprises Blind Source Separating the speech signal component.

8. The method of claim 1, wherein performing non-linear noise suppression comprises performing spectral subtraction on the speech reference signal.

9. The method of claim 8, wherein performing spectral subtraction comprises:
   estimating a noise within a frequency bin based on the noise signal; and
   adjusting a gain applied to a portion of the speech signal within the frequency bin based on the noise in the frequency bin.

10. The method of claim 8, wherein performing spectral subtraction comprises:
- generating an echo estimate signal associated with one of the multiple microphone signals;
- estimating a noise within a frequency bin based on the noise signal;
- estimating an echo within a frequency bin based on the echo estimate signal; and
- adjusting a gain applied to a portion of the speech signal component within the frequency bin based on the noise and the echo in the frequency bin.

11. The method of claim 1, further comprising:
- performing echo cancellation on each of the multiple microphone signals; and
- de-correlating a residual noise in the speech reference signal from the noise signal.

12. The method of claim 11, wherein performing nonlinear noise suppression comprises performing spectral subtraction on the speech reference signal based on a noise estimate derived from the noise signal.

13. An apparatus for noise reduction in multiple microphone systems, the apparatus comprising:
- a first echo canceller configured to cancel an echo in a first microphone signal to generate a first echo canceled microphone signal;
- a second echo canceller configured to cancel an echo in a second microphone signal to generate a second echo canceled microphone signal;
- a signal separator configured to receive the first and second echo canceled microphone signals and separate a speech signal component from a noise signal component to generate a speech reference signal and a noise reference signal; and
- a non-linear processing module configured to receive the speech reference signal and noise reference signal and perform non-linear processing on the speech reference signal.

14. The apparatus of claim 13, further comprising a post processing module configured to implement center clipping on the speech reference signal output by the non-linear processing module based on a voice activity state.

15. The apparatus of claim 14, further comprising a voice activity detection module configured to determine the voice activity state based on the speech reference signal and noise reference signal.

16. The apparatus of claim 13, further comprising a post processing module configured to implement comfort noise injection on the speech reference signal output by the nonlinear processing module based on a voice activity state.

17. The apparatus of claim 13, wherein the first echo canceller comprises:
- an adaptive filter configured to receive a echo signal source and provide a filtered echo signal and configured to minimize a metric determined based on a feedback signal; and
- a signal summer configured to subtract the filtered echo signal from the first microphone signal, and configured to couple the first echo canceled microphone signal as the feedback signal.

18. The apparatus of claim 13, wherein the signal separator comprises:
- a de-correlator configured to de-correlate the first echo canceled microphone signal from the second echo canceled microphone signal; and
- a Blind Source Separator configured to separate a speech signal component from a noise signal component based on de-correlated first echo canceled microphone signal and the second echo canceled microphone signal from the de-correlator.

19. The apparatus of claim 18, wherein the signal separator further comprises a post processing module configured to de-correlate a residual noise in the speech reference signal from the noise reference signal output from the Blind Source Separator.

20. The apparatus of claim 13, wherein the first echo canceller is configured to generate an echo estimate signal from the first microphone signal, the apparatus further comprising:
- a non-linear processing module for generating a modified speech estimate signal based on the echo estimate signal, the speech reference signal, and the noise estimate signal, the modified speech reference signal having reduced noise and echo characteristics.

21. The apparatus of claim 20, wherein the non-linear processing module comprises:
- a first frequency transform module for converting the speech reference signal into a plurality of frequency domain speech reference signals;
- a second frequency transform module for converting the noise reference signal into a plurality of frequency domain noise reference signals;
- a third frequency transform module for converting the echo estimate signal into a plurality of frequency domain echo estimate signals;
- a spectral gain controller for receiving one of the plurality of frequency domain speech reference signals, one of the frequency domain noise reference signals, and one of the plurality of frequency domain echo estimate signals, and for generating a gain control signal for a frequency band associated with the particular frequency domain speech signal received by the spectral gain controller;
- a gain module for receiving the plurality of frequency domain speech reference signals and the gain control signal and for adjusting the gain of one of the plurality of frequency domain speech reference signals associated with the frequency band; and
- a time transform module for receiving the gain-controlled frequency domain speech reference signal and generating the modified speech reference signal.

22. The apparatus of claim 13, wherein the non-linear processing module comprises:
- a first frequency transform module for converting the speech reference signal into a plurality of frequency domain speech reference signals;
- a second frequency transform module for converting the noise reference signal into a plurality of frequency domain noise reference signals;
- a third frequency transform module for converting the echo estimate signal into a plurality of frequency domain echo estimate signals;
- a spectral gain controller for receiving one of the plurality of frequency domain speech reference signals, one of the frequency domain noise reference signals, and one of the plurality of frequency domain echo estimate signals, and for generating a gain control signal for a frequency band associated with the particular frequency domain speech signal received by the spectral gain controller;
- a gain module for receiving the plurality of frequency domain speech reference signals and the gain control signal and for adjusting the gain of one of the plurality of frequency domain speech reference signals associated with the frequency band; and a time transform module for receiving the gain-controlled frequency domain speech reference signal and generating the modified speech reference signal.

23. An apparatus for noise reduction in multiple microphone systems, the apparatus comprising:
- means for receiving multiple microphone signals;
- means for de-correlating the multiple microphone signals;
- means for separating a speech signal component from a noise signal in at least one of the multiple microphone signals to generate separated microphone signals; and
- means for performing non-linear noise suppression on a speech reference signal of the separated microphone signals.

24. The apparatus of claim 23, further comprising means for performing echo cancellation on each of the multiple microphone signals.

25. A non-transitory processor readable media including instructions that may be utilized by one or more processors, the non-transitory processor readable media comprising:
- instructions for de-correlating multiple received microphone signals;
- instructions for separating a speech signal component from a noise signal in at least one of the multiple received microphone signals to generate separated microphone signals; and
- instructions for performing non-linear noise suppression on the speech signal component.

26. The non-transitory processor readable media of claim 25, wherein the instructions for separating the speech signal comprise instructions for Blind Source Separating the speech signal component.

27. The non-transitory processor-readable media of claim 25, further comprising:
- instructions for generating an echo estimate signal associated with one of the multiple microphone signals;
- instructions for estimating a noise within a frequency bin based on the noise signal;
- instructions for estimating an echo within a frequency bin based on the echo estimate signal; and
- instructions for adjusting a gain applied to a portion of the speech signal component within the frequency bin based on the noise and the echo in the frequency bin.

28. The non-transitory processor readable media of claim 25, wherein the non-transitory processor readable media further comprising:
- instructions for performing echo cancellation on each of the multiple microphone signals.

29. A circuit for noise reduction in multiple microphone systems, the circuit comprising:
- a first echo canceller configured to cancel an echo in a first microphone signal to generate a first echo canceled microphone signal;
- a second echo canceller configured to cancel an echo in a second microphone signal to generate a second echo canceled microphone signal;
- a signal separator configured to receive the first and second echo canceled microphone signals and separate a speech signal component from a noise signal component to generate a speech reference signal and a noise reference signal; and
- a non-linear processing module configured to receive the speech reference signal and noise reference signal and perform non-linear processing on the speech reference signal.

30. The circuit of claim 29, further comprising a post processing module configured to implement center clipping on the speech reference signal output by the non-linear processing module based on a voice activity state.

31. The circuit of claim 30, wherein the circuit is an integrated circuit.

32. The circuit of claim 29, wherein the first echo canceller is configured to generate an echo estimate signal from the first microphone signal, the circuit further comprising:
- a non-linear processing module for generating a modified speech estimate signal based on the echo estimate signal, the speech reference signal, and the noise estimate signal, the modified speech reference signal having reduced noise and echo characteristics.

* * * * *